No. 709,053. Patented Sept. 16, 1902.
C. H. SHAW.
PHOTOGRAPHIC FILM.
(Application filed Sept. 10, 1901.)
(No Model.)
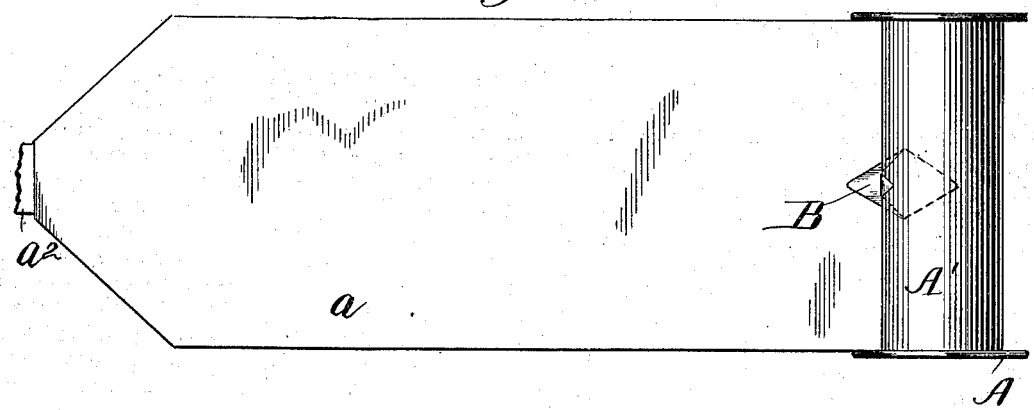
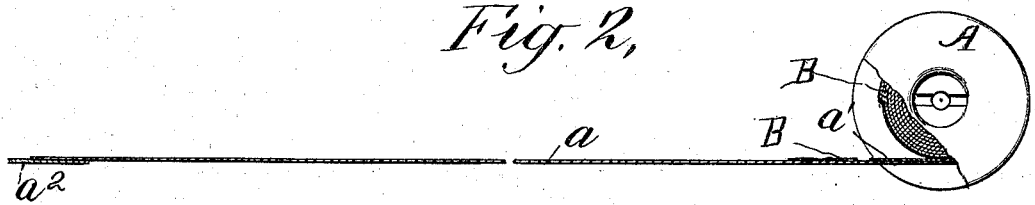
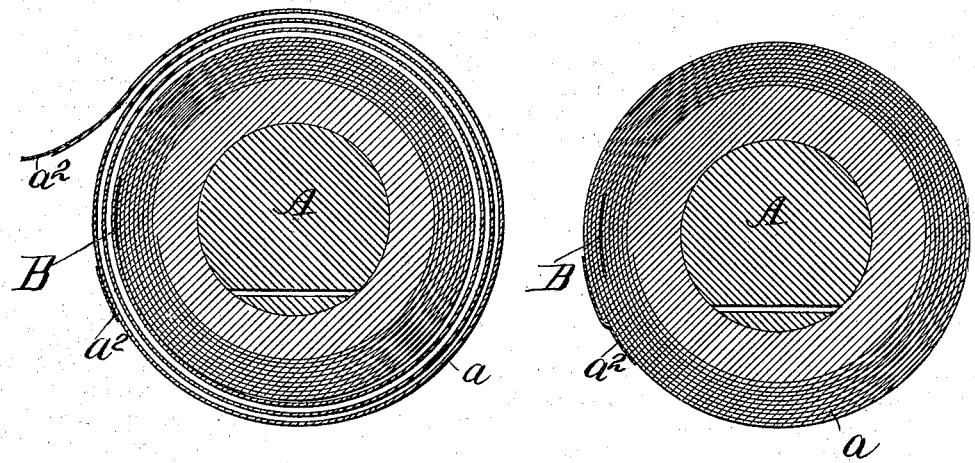
WITNESSES:
INVENTOR
Chas. H. Shaw

UNITED STATES PATENT OFFICE.

CHARLES H. SHAW, OF BROOKLYN, NEW YORK.

PHOTOGRAPHIC FILM.

SPECIFICATION forming part of Letters Patent No. 709,053, dated September 16, 1902.

Application filed September 10, 1901. Serial No. 74,910. (No model.)

*To all whom it may concern:*

Be it known that I, CHARLES HARRIS SHAW, a citizen of the United States, residing in the borough of Brooklyn, city of New York, county of Kings, and State of New York, have invented certain new and useful Improvements Relating to Photographic Films, of which the following is a specification.

My invention relates to sensitized strips or films used in photographic cameras. As is well known, the sensitized strip is used in connection with an opaque backing, and the two are spirally wound upon a spool. The opaque strip is for the purpose of excluding light from the sensitized strip, and it is made longer than the sensitized strip, and the extra length is coiled upon itself and its end secured by a paper label or seal to prevent the opaque strip and sensitized strip from unwinding or uncoiling. When the film is to be inserted in a camera, the paper label or seal is broken and the opaque strip unwound sufficiently to enable it to be "threaded" in the usual manner. It oftentimes happens that when the label or seal is broken the opaque strip is not held firmly, and when it is not it unwinds or uncoils quickly, allowing the adjacent convolutions of the sensitized strip to become separated, and it thus becomes light-struck. Even sholud the opaque strip be held firmly in one hand it is difficult and awkward to "thread" the camera with any degree of quickness, owing to having practically only one hand free.

My invention is designed to prevent, after the outer label or seal has been broken, the sensitized film from becoming unwound or uncoiled, and hence becoming light-struck. A sufficient length of opaque strip is left free to unwind or uncoil upon the breaking of the outer label or seal to enable the camera to be threaded. After the film has been threaded and the camera closed the further unwinding of the film by rotating one spool in the usual manner causes a disruption of the device or means which prevents the uncoiling of the sensitized strip, thereby permitting portions of the sensitized strip to be successively presented for exposure.

I will describe a photographic film embodying my invention and then point out the novel features thereof in the claims.

In the accompanying drawings, in which similar letters of reference designate corresponding parts, Figure 1 is a view in elevation of a photographic film partly unwound to show my invention applied thereto. Fig. 2 is a longitudinal sectional view of the film shown in Fig. 1. Fig. 3 is a cross-sectional view of a photographic film having my invention applied thereto, the film being wound and the end of the opaque strip held by the usual label or seal. Fig. 4 is a view similar to Fig. 3, excepting that the strip or seal has been broken and the opaque strip partly unwound or uncoiled. Figs. 3 and 4 are drawn to a larger scale than Figs. 1 and 2, and the film is conventionally shown in these figures.

The construction of film may be similar to that shown and described in United States Patent No. 539,713, granted May 21, 1895, to S. N. Turner. Wherever I have used the term "film" or "photographic film," I mean the sensitized and opaque strips combined.

A represents a spool which is of the construction usually employed to receive a photographic film.

A' represents a photographic film consisting of an opaque strip $a$ and a sensitized strip $a'$ laid thereupon. The opaque strip $a$ is considerably longer than the sensitized strip $a'$, which is so arranged on the opaque strip as to have the opaque strip extend beyond the ends of the sensitized strip. The photographic film is tightly wound or coiled upon the spool A in the usual manner, and one end of the opaque strip is held or secured by a label, seal, or other device $a^2$, which is applied to prevent the photographic film from unwinding or uncoiling, (see Fig. 3,) and it is in this form that the film is sold. When the film is to be used, the label $a^2$ is broken and that end of the opaque strip unwound to permit of the film being threaded in the camera. As hereinbefore stated, unless the opaque strip is held tightly after the label $a^2$ is broken the whole film will become loose on the spool and the adjacent convolutions of the film separated to such a degree that the film will become light-struck. The manner in which the film would become unwound or loosened is partially illustrated in Fig. 4. To prevent the whole film or a portion of it from becoming unwound after the label $a^2$ has been broken, I provide a device or seal B or other equivalent means between adjacent convolutions of one end portion of the opaque strip a. The seal is so located relatively to one end of the sensitized film as to prevent the sensitized and opaque strips between it and the spool from being unwound or loosened, but permitting the free end portion of the opaque strip becoming unwound or unloosened, as clearly shown in Fig. 4. The loosened or unwound portion will be of a length sufficient to permit of the film being threaded in the camera. Preferably the seal or other means for performing the same function will be fragile or of such nature as to be easily destroyed or disrupted, and this by the act of winding the film from one spool onto another when the film is arranged in the camera. As here shown, the seal B consists of a strip or strips of paper gummed on both sides and of such nature or consistency that when in position and glued it will either strip or peel. The seal B may be of any size or shape. Preferably it will not be very large, so as not to interfere with the winding of the film. It will be seen that after the breaking of the label there is no possibility of the film becoming unwound or loosened on account of the interposed seal B.

It is obvious that instead of a paper seal B gum may be employed to unite adjacent coils of the opaque strip. Also other means other than the label $a^2$ may be employed to hold the outer end of the opaque strip. If desired, this end of the strip may be left entirely free.

Having thus described my invention, what I claim as new is—

1. In combination with a photographic film coiled upon a spool, of means located between the ends of the film for preventing the film uncoiling or becoming loosened until such means are broken or otherwise destroyed, said means arranged intermediate of the side edges of the film and at such a distance from the outer end thereof as to permit of the film being threaded in a camera with the said means unbroken.

2. In combination with a photographic film consisting of a sensitized strip and an opaque strip, which strips are superimposed and wound upon a spool, a device for securing the end of the film to prevent it from unwinding, and a second device intermediate the ends of the film and arranged between, and overlaid by, adjacent coils of the film for preventing a portion of the film from becoming unwound or loosened after the breaking of the first device.

3. In combination with a photographic film, wound upon a spool, of a paper seal arranged between, and overlaid by, adjacent coils of the opaque strip of the film for preventing a portion of the film from unwinding or becoming loosened on the spool, until after the seal is destroyed, and a device for securing an end of the film beyond said paper seal.

4. In combination with a photographic film comprising a sensitized strip, and an opaque strip of greater length than said sensitized strip, said photographic film coiled upon a spool, fragile means located intermediate an end of the sensitized strip and an end of the opaque strip for preventing the film from becoming unwound or loosened on the spool until broken, and a device for securing an end of the paper beyond said means.

5. In combination with a photographic film coiled upon a spool, of means for securing the end of the opaque strip thereof to prevent the film from becoming unwound or loosened until it is broken, and a second means located intermediate of the said secured end of the opaque strip and the adjacent end of the sensitized strip for preventing that portion of the film comprising the sensitized strip from becoming unwound or loosened after the first means is destroyed, said means consisting of a paper piece rendered adhesive on both sides.

6. The combination with a spool and a photographic film wound thereon, of a seal, located between adjacent convolutions of the wound film, and secured thereto by adhesion on both sides, so that said adjacent convolutions will be secured to opposite sides of the said seal.

7. The combination with a spool and a photographic film wound thereon, of a seal composed of paper or similar material, and rendered adhesive on both sides, located between adjacent convolutions of the wound film, whereby adjacent convolutions will be secured to opposite sides of the said seal.

8. The combination with a spool and a photographic film wound thereon, of a seal, located between adjacent convolutions of the wound film, and secured thereto by adhesion on both sides, so that said adjacent convolutions will be secured to opposite sides of the said seal, and arranged at such a distance from the outer end of the film as to permit of the film being threaded in a camera with the said seal unbroken.

9. The combination with a spool and a photographic film wound thereon, of a seal composed of paper or similar material, and rendered adhesive on both sides, located between adjacent convolutions of the wound film, whereby adjacent convolutions will be secured to opposite sides of the said seal, and arranged at such a distance from the outer end of the film that at least one coil may be unwound before the said seal is broken.

In testimony whereof I have signed my name to this specification in the presence of two subscribing witnesses.

CHARLES H. SHAW.

Witnesses:
GEO. E. CRUSE,
JOSEPH P. McELDUFF.